June 23, 1931.    F. L. SCHOEL    1,811,564
ADJUSTABLE DOUGHNUT MACHINE
Filed April 14, 1930    2 Sheets-Sheet 1

Witness
Ray A Wilson

Inventor
Fred L. Schoel
by Bair, Freeman & Sinclair
Attorneys

June 23, 1931.  F. L. SCHOEL  1,811,564
ADJUSTABLE DOUGHNUT MACHINE
Filed April 14, 1930  2 Sheets-Sheet 2
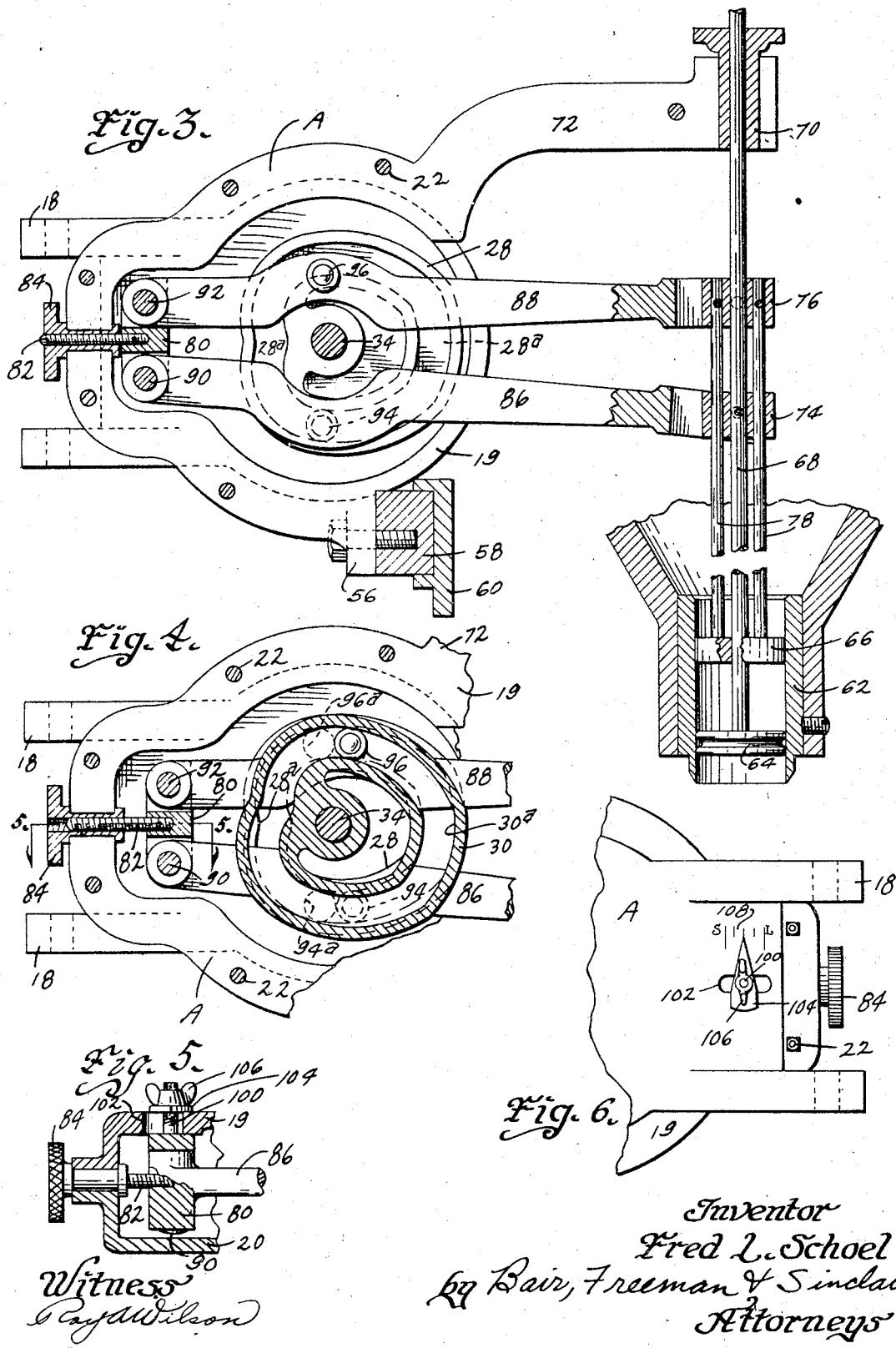
Inventor
Fred L. Schoel
by Bair, Freeman & Sinclair
Attorneys Patented June 23, 1931

1,811,564

UNITED STATES PATENT OFFICE

FRED L. SCHOEL, OF WATERLOO, IOWA

ADJUSTABLE DOUGHNUT MACHINE

Application filed April 14, 1930. Serial No. 444,290.

The object of my invention is to provide an adjustable doughnut machine which is simple, durable and comparatively inexpensive to manufacture.

A further object of my invention is to provide an improved type of adjustment for dough dispensing machines which may be easily adjusted while the machine is in operation and in this respect as well as in the respect that it is simpler in construction, the present invention is an improvement over the machine illustrated in my copending application, Serial Number 414,942, filed December 18, 1929.

More particularly, it is my object to provide in a dough dispensing machine having a dough hopper and a pair of movable members for dispensing dough therefrom, an arm operatively connected with each movable member, a pair of cams for coaction with the arms respectively for moving them upon rotation of a shaft to which the cams are affixed and a bearing member to which the arms are pivoted and which is capable of movement toward and away from the shaft to vary the coaction of the arms relative to the cams and thereby change the sizes of the charges of dough dispensed from the hopper as desired.

A further object is to provide means for supporting the cam shaft and the bearing member with an adjusting nut or the like to actuate the bearing member for varying the sizes of charges of dough and a means for locking the bearing member in any desired position of its adjustment.

Still a further object is to provide an indicating mechanism whereby to advise the operator as to the size of the charge of dough being dispensed from the machine.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 4 is a sectional view on the line 4—4 of Figure 2 illustrating the other cam in section and showing the parts adjusted to a different position.

Figure 5 is a sectional view on the line 5—5 of Figure 4.

Fig. 6 is a side elevation of a portion of the device as viewed from the opposite side of Figure 1 and showing an adjustment scale and locking device and Figure 7 is a perspective view of the bearing member.

Figure 1:
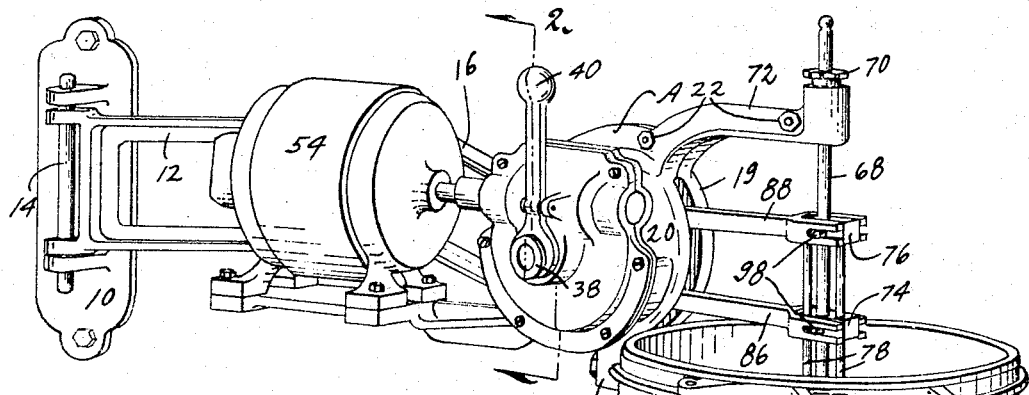
Figure 1 is a perspective view of my improved type of adjustable doughnut machine.
Figure 2:
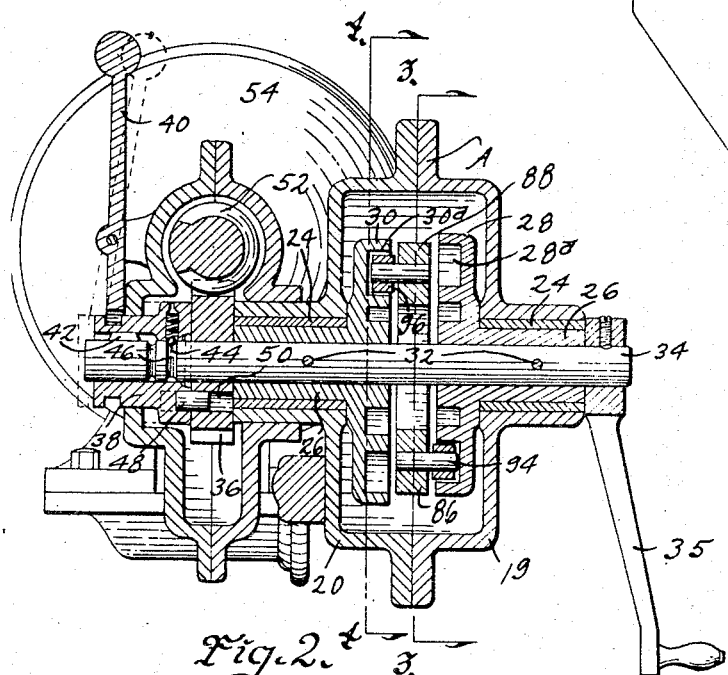
Figure 2 is an enlarged sectional view on the line 2—2 of Figure 1 illustrating the driving mechanism for the dough dispensing structure.

On the accompanying drawings, I have used the reference numeral 10 to indicate a supporting bracket which may be secured to a wall or other vertical surface. A supporting arm 12 extends from a pivot pin 14 carried by the bracket 10 and a second supporting arm 16 is pivotally connected with the outer end of the supporting arm 12. A housing A, having a pair of perforated ears 18, is pivoted to the outer end of the supporting arm 16, all as fully set forth in my co-pending application.

The housing A consists of a pair of members 19 and 20 which may be secured together by suitable bolts or the like 22. Bearing sleeves 24 are mounted in the housing members 19 and 20 and cam sleeves 26 are journalled therein. The cam sleeves 26 are formed on cams 28 and 30, the cam grooves of which are indicated at 28a and 30a. By means of pins 32, the cams 28 and 30 are both fixed to a shaft 34.

A worm gear 36 is loosely mounted on the shaft 34 but may be locked relative thereto by sliding the clutch member 38. A clutch lever 40 is provided for sliding the member 38. The clutch member 38 is keyed by a key 42 to the shaft 34 whereby it is slidable thereto, but not rotatable thereon. By means of a spring pressed ball 44 and a pair of grooves 46, the clutch member 38 is retained in either operative or inoperative position.

The clutch member 38 is provided with a stud pin 48 adapted to enter one of a plurality of openings 50 in the worm gear 36.

A worm 52, secured to the shaft of a drive motor 54, serves to rotate the worm 52 and thereby impart rotation at a reduced speed to the worm gear 36. The clutch construction just described is fully set forth and claimed in my co-pending application.

Secured to an ear 56 extending down from each of the housing members 19 and 20 is a supporting ring 58 for supporting a hopper 60. The supporting ring 58 is split and the parts are hinged together whereby it may be opened for removing the hopper 60 as when it is desired to clean the hopper.

Within the hopper 60 I provide a discharge neck 62 through which discharge pistons 64 and 66 reciprocate. A rod 68 extends upwardly from the piston 64 and slidably through a bearing sleeve 70 supported by an arm 72 extending from the housing A. A block 74 is secured to the rod 68 and the rod extends slidably through a similar block 76. By means of rods 78, the piston 66 is operatively connected with the block 76. The rods 78 extend slidably through the block 74.

Figure 3:
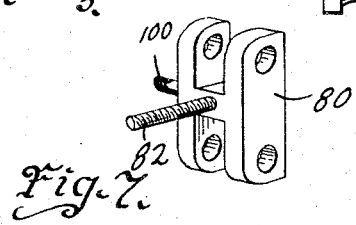
Figure 3 is a vertical central sectional view illustrating one of the cams and the adjustable bearing member of the device as taken on the line 3—3 of Figure 2.

Within the housing A I provide a bearing member 80 which is adapted to slide toward or away from the shaft 34. It is supported by a screw threaded rod 82 which is fixed to the bearing member 80 and which is screw threaded in an adjusting nut 84. The adjusting nut 84 is confined against longitudinal movement relative to the housing A by means of flanges as best shown in Figure 3. Thus by rotating the nut 84, the bearing member 80 may be adjusted toward or away from the shaft 34, as desired. Arms 86 and 88 are pivoted on pins 90 and 92 carried by the bearing member 80. The arm 86 is provided with a pin and roller 94 to coact with the cam groove 28a of the cam 28. The arm 88 is provided with a pin and roller 96 to coact with the cam groove 30a of the cam 30. The outer ends of the arms 86 and 88 are slotted as illustrated in Figure 1 to receive pins 98 extending from the sides of the blocks 74 and 76 whereby swinging movement of the arms will impart reciprocating movement to the pistons 64 and 66 for discharging dough from the hopper 60.

As shown at the dotted line positions 94a and 96a in Figure 4, the rollers 94 and 96 may be adjusted to one position relative to the cam grooves 28a and 30a (when adjusted as shown in Figure 3) or may be adjusted to other positions such as the one shown by solid lines in Figure 4 which actually advances one of the rollers and retards the other one relative to the cam grooves. The effect of such adjustment is to change the spacing between the pistons 64 and 66 in their upward and downward travel for consequently changing the charge of dough held between them. This adjustment can be easily made while the machine is in operation.

I have provided a means for locking the bearing member 80 against undesired movement after it has been adjusted which consists of a threaded stud 100 extending in a slot 102 (see Figures 5 and 6). A pointer 104, held against rotative movement in any desired manner, is mounted on the stud 100 and a wing nut 106 is screwed onto the stud. Indicating marks 108 with an "S" and an "L" to indicate small and large dough charges respectively are applied to the housing A for indicating in conjunction with the pointer 104 the desired size of the charge of dough.

The machine illustrated is for forming doughnuts and in operation the piston 66 travels above the upper end of the neck 62 to allow dough to be confined between the pistons 64 and 66 on their subsequent downward movement.

The piston 64 has its lower limit of movement below the lower end of the neck 62 and after reaching such limit of movement the piston 66 continues to move down for forcing a ring of dough down around the edge of the piston 64. Subsequently the piston 64 moves upwardly and cuts the charge of dough off at the same time making a hole in it. Varying the position of the bearing member 80 causes a consequent variation in the distance between the piston 64 and 66 and consequently in the charge of dough between the pistons. My improved type of adjustment can be used on other types of dough dispensing machines as well as on the one illustrated.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a dough dispensing machine having a dough hopper and a movable member for dispensing dough therefrom, a shaft, a cam thereon, an arm pivotally connected with said movable member, the cam surface of said cam coacting with said arm to move the same upon rotation of the shaft, a bearing member, one end of said arm being pivoted to said bearing member, said bearing member being movable toward and away from said movable member to vary the pivot point of said arm relative to said cam and said movable member.

2. In a dough dispensing machine, a dough hopper, a pair of movable members for dispensing charges of dough from said hopper, an arm operatively connected with each movable member, a shaft, a cam thereon for coaction with each arm to move them upon rotation of said shaft, a bearing member, one end of each arm being pivoted thereto, said bearing member being capable of movement to vary the coaction of said arms relative to said cams.

3. In a dough dispensing machine, a dough hopper, a pair of movable members for dispensing charges of dough from said hopper, an arm operatively connected with each movable manner, a shaft, a cam thereon for coaction with each arm to move them upon rotation of said shaft, a bearing member, one end of each arm being pivoted thereto, said bearing member being capable of movement towards and away from said shaft to vary the coaction of said arms relative to said cams. cams.

4. In a dough dispensing machine, a dough hopper, a pair of movable members for dispensing charges of dough from said hopper, an arm operatively connected with each movable member, a shaft, a cam thereon for coaction with each arm to move them upon rotation of said shaft, a bearing member, one end of each arm being pivoted thereto, a frame, said shaft being journaled in said frame, a rod extending from said bearing member and slidably thru said frame and means for locking said bearing member against sliding movement relative to said frame.

5. In a dough dispensing machine, a dough hopper, a pair of movable members for dispensing charges of dough from said hopper, an arm operatively connected with each movable member, a shaft, a cam thereon for coaction with each arm to move them upon rotation of said shaft, a bearing member, one end of each arm being pivoted thereto, a frame, said shaft being journaled in said frame, a threaded rod, an adjusting nut, said rod being associated with said bearing member and said nut and the nut being associated with the frame whereby to vary the position of the bearing member relative to the frame.

Des Moines, Iowa, March 31, 1930.

FRED L. SCHOEL.